May 15, 1928.  1,670,088

L. S. WALLE

ELECTRIC SWITCH

Filed Dec. 31, 1923

Inventor:
Ludwig S. Walle,
by His Attorney.

Patented May 15, 1928.

1,670,088

UNITED STATES PATENT OFFICE.

LUDWIG S. WALLE, OF SCOTIA, NEW YORK, ASSIGNOR TO GENERAL ELECTRIC COMPANY, A CORPORATION OF NEW YORK.

ELECTRIC SWITCH.

Application filed December 31, 1923. Serial No. 683,565.

My invention relates to electric switches and it has for its principal object the provision of an improved switch operating and control mechanism whereby the switch will be immediately tripped open upon the occurrence of a reverse current of a predetermined value or upon an increase in the current in the normal direction above a predetermined value, the tripping of the switch being effective regardless of the position of the switch closing mechanism. A switch with the operating and control mechanism involving my invention is particularly well adapted for use in the control of the direct current side of a power system in which an alternating current supply is transformed as by a synchronous converter to direct current. In the example illustrated, the switch is closed by means of a cam operated toggle mechanism, in which the toggle links are arranged between the switch and the cam so as to be moved bodily in transmitting the closing force to the switch and which is maintained underset by a connection to the armature of a normally energized electromagnet. This magnet has a voltage winding for the normal excitation thereof and is provided with a reverse current winding to oppose the flux of the voltage winding on a reversal of current to cause the release of the armature. The connection between the toggle and the armature may comprise a second toggle which is normally over-set and which is tripped by an overload electromagnet connected in the main circuit. By this mechanism the main switch will be automatically tripped open either by a reversal of current in the direct current line such as might result from the occurrence of a short circuit on the alternating current side of the converter or on the direct current line between the switch and the converter where the direct current line is fed from more than one source or by a predetermined overload current in the normal direction on the direct current line, each of the reverse current and the overload devices being effective to trip the switch independently of the other and each being also effective to trip the switch regardless of whether or not the operating cam has come to its position of rest.

My invention will be better understood by reference to the accompanying specification and drawing and its scope will be pointed out in the appended claims.

Figure 2:
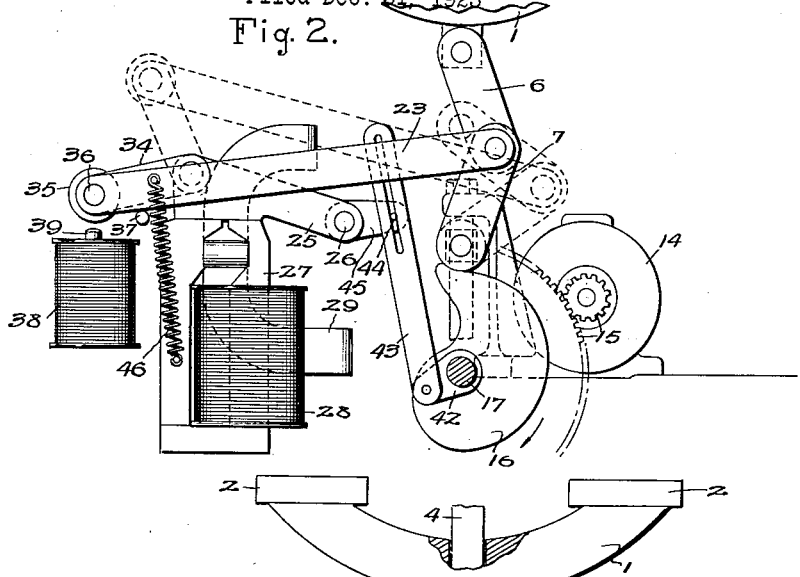
Figure 1:
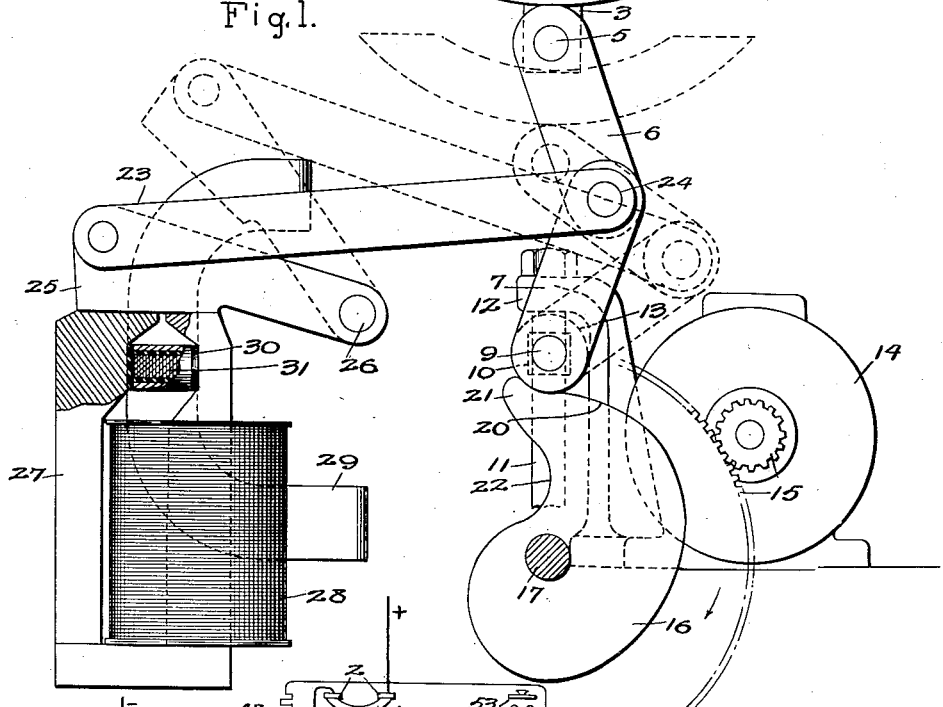
Figure 3:
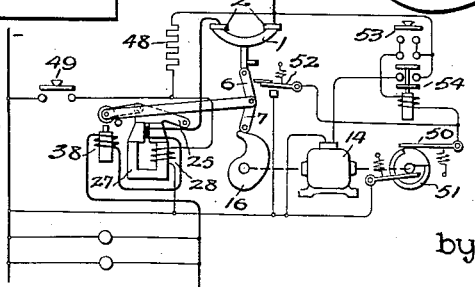

Figure 1 is a side elevation of a switch operating and control mechanism involving my invention; Fig. 2 is a similar view, drawn at a reduced scale, showing a modification; and Fig. 3 is a circuit diagram.

Referring first to Fig. 1, the main switch is shown for the purpose of illustration as a bridging member 1 in engagement with stationary contacts 2. The cross head 3 secured to the member 1 slides in the guide 4 and has pivoted thereto at 5 link 6 of toggle links 6 and 7. The lower end of link 7 is attached by pivot 9 to a second cross head 10 which is slidably mounted upon the guide 11 shown supported by a bracket 12. A cam engaging roller 13 is mounted on pivot 9. The force for closing the switch is shown provided by an electric motor 14, which through the reduction gearing 15 rotates the cam 16 mounted on the shaft 17. The cam 16 is adapted to make a single revolution to close the switch and may be given whatever curvature is necessary to produce the desired movement of the switch. It is preferably provided with a section 20 which has a uniform radius, and at the end of this section 20 the cam preferably is provided with a lip 21. Beyond the lip the cam has a curved undercut portion 22 to receive the roller 13. As will appear from the description to follow, the motor circuit is automatically opened when, in the rotation of the cam, the roller 13 enters upon the concentric section 20, at which time the switch is fully closed. The momentum of the rotating parts continues the movement of the cam until the lip reaches the roller 13 when further movement is arrested.

During the closing movement of the mechanism just described, the toggle links 6 and 7 have been maintained in the underset position illustrated by means of a link 23 connected at one end to the common pivot center 24 of the toggle links 6 and 7 and pivotally connected at the opposite end to the armature 25 which itself is secured to the pin 26 mounted on a support not shown. The armature 25 is normally retained against the poles of the electromagnet 27 which has a voltage winding 28 and a reverse current winding 29, commonly termed a "bucking bar" and comprising a bar bent to make a single turn 30 about a small laminated core section 31 bridging the air gap of the magnet. The construction of the magnet forms no part of the present invention. Upon a deenergization of the magnet 27 due to a reversal of current in the reverse current winding 29, the armature 25 is released and the toggle links 6 and 7 are permitted to collapse allowing the switch to fall open. This position of the parts is shown in dotted lines, a suitable stop, not shown, being provided to limit the downward movement of the switch. When the cam is again rotated to reclose the switch, the roller 13 first rides over the nose 21, then drops into the curved undercut portion 22 when the toggle links straighten out and the armature 25 falls back against the magnet.

Referring now to the modified form of my invention illustrated in Fig. 2, it will be seen that the switch-closing mechanism and the control magnet are identical with those shown in Fig. 1, the difference lying in the means for releasing the toggle links 6 and 7. In this form of the invention, the link 23 instead of connecting directly with the armature 25 is connected to it through a short link 34. A roller 35 is mounted on the pivot pin 36 connecting the links 23 and 34 and a stop 37 is provided to limit downward movement of link 23 but permitting the toggle formed by links 23 and 34 to reach the overset position illustrated. This toggle is adapted to be tripped upon the occurrence of a predetermined overload on the direct current line and for this purpose a solenoid 38 having a plunger 39 is provided, the construction being such that when such overload occurs the plunger will strike the roller 35 and cause the release of this toggle. The main toggle is thereby also released, the parts then taking the position indicated by dotted lines. It will be noted that the armature 25 has not moved but has remained in position ready to be released should a reversal in current occur. Upon rotation of the cam in the resetting operation, both toggles drop into the position illustrated by full lines in Fig. 2 after the nose 21 of the cam has passed the roller 13. Where the cam is rotated at a comparatively high speed, it has been found advisable to provide some means for positively restoring the toggle links 6 and 7 to their straightened position after the nose of the cam has been passed and before it has rotated an appreciable amount further and also for restoring the armature 25 and link 23 to their original positions, indicated by full lines on the drawing. For this purpose I have provided the shaft 17 with a crank 42, to which is pivoted a link 43 and engaging in a long slot in the opposite end of the link is a pin 44 carried by a crank 45 fast on the pin 26. As the cam rotates in a clockwise direction the lower end of the slot in link 43 will engage the pin 44 if the armature is in an elevated position and positively return it to the magnet face and accordingly force the roller 13 of the main toggle against the cam at the undercut portion 22. An analogous means may be employed to return links 23 and 34 to their original positions but where the speed of rotation of the cam is not too great, spring means may be relied upon to assist the force of gravity in returning the armature and toggles to their original positions. At 46 I have shown, by way of example, a spring connecting the magnet and the link 23, which device is particularly useful in returning the link and toggles after the switch has been tripped by the overload solenoid.

In Fig. 3, I have shown diagrammatically, by way of example, the above described apparatus and circuit connections therefor, together with certain control devices which may be advantageously used therewith. The main switch 1 is shown connected in series with the reverse current winding and the overload solenoid, although obviously this winding and solenoid may be connected to the line through a shunt. The potential of the magnet connects with the winding 28 of the magnet connects with the line through a resistance 48 and a hand switch 49 permits shunting the winding to trip the switch manually. Obviously the winding 28 may be deenergized by opening its circuit instead of shunting it. For opening the motor circuit at the instant the roller 13 reaches the concentric portion 20 of the cam, I have shown by way of example a brush 50 bearing against a contact segment 51 on the cam shaft, the arrangement being such that the circuit is reestablished as soon as the nose of the cam has passed the roller 13. A control switch 52 is operatively connected with the main switch to be closed whenever the latter is open. To close the main switch a hand switch 53 is first closed whereby the sealing switch 54 is operated to close the motor circuit. The circuit of the hand switch and sealing switch is completed first through the switch 52, then as the cam rotates is completed through members 50, 51 until the end of the segment 51 is reached when the sealing switch 54 opens the motor circuit.

The construction of the cam 16 and the arrangement whereby the driving motor therefor is deenergized when the switch reaches its closed position are described and claimed in the copending application of Oliver C. Traver, Serial No. 686,683, filed Jan. 16, 1924, and assigned to the same assignee as the present application.

While I have described certain embodiments of my invention, I do not wish to be limited to the particular forms shown and described, as it will be apparent that many modifications therein may be made without departing from the scope of my invention as set forth in the appended claims.

What I claim as new and desire to secure by Letters Patent of the United States, is,—

1. In an electric switch for controlling a circuit having relatively movable contact members, means for moving one of said contact members into engagement with another comprising an operating member and a thrust transmitting toggle mechanism arranged to be engaged at one end by said operating mechanism and to be moved bodily thereby in extended relation, and electromagnetic means responsive to current conditions in said circuit for maintaining the parts of said toggle mechanism in extended thrust transmitting relation.

2. In an electric switch having a stationary and a movable contact member, means for actuating said movable contact member, a pair of toggle links arranged between the movable contact member and the actuating means for transmitting the thrust of the latter to the former, and an electromagnet having an armature operatively connected to said toggle links to maintain said links normally in extended relation and arranged when released by the magnet to release the toggle links.

3. In an electric switch having a stationary contact member, a movable contact member and means for actuating said movable contact member, a toggle between said movable contact member and said actuating means adapted to be moved bodily in extended position by said means, electromagnetic means for preventing buckling of said toggle, and means adapted to respond to a reverse current for rendering said electromagnetic means ineffective.

4. In an electric switch having a stationary contact member, a movable contact member and an actuating means for said movable contact member, a toggle between said movable contact member and said actuating means adapted to be moved bodily in an extended underset position by said actuating means to close said switch, and a trip free mechanism for maintaining said toggle extended and underset comprising a second toggle and means responsive to a predetermined overload for tripping said second toggle.

5. In an electric switch having a stationary contact member, a movable contact member and a motor driven cam for actuating said movable contact member, a toggle comprising a pair of links arranged to be moved bodily to transmit the thrust from said cam to said movable contact member, an electromagnet having an armature connected to said toggle links to maintain the same in extended thrust transmitting relation while said electromagnet is energized, the connection between said toggle links and said armature comprising a second toggle, an overload responsive device for releasing said second toggle, and a reverse current responsive device for deenergizing said electromagnet.

In witness whereof, I have hereunto set my hand this 29th day of December, 1923.

LUDWIG S. WALLE.